United States Patent

Noro et al.

[11] Patent Number: 6,026,926
[45] Date of Patent: Feb. 22, 2000

[54] ELECTRIC POWER STEERING APPARATUS

[75] Inventors: Yoshiki Noro; Yoshinobu Mukai, both of Wako, Japan

[73] Assignee: Honda Giken Kogyo Kabushiki Kaisha, Tokyo, Japan

[21] Appl. No.: 09/115,586

[22] Filed: Jul. 14, 1998

[30] Foreign Application Priority Data

Jul. 25, 1997 [JP] Japan ................................ 9-200465
Aug. 8, 1997 [JP] Japan ................................ 9-215275

[51] Int. Cl.$^7$ ........................................................ B62D 5/04
[52] U.S. Cl. ........................... 180/446; 180/443; 701/41
[58] Field of Search .................................. 180/443, 446; 701/41

[56] References Cited

U.S. PATENT DOCUMENTS

| | | | |
|---|---|---|---|
| 5,510,989 | 4/1996 | Zabler et al. | 364/424.05 |
| 5,600,559 | 2/1997 | Nishimoto et al. | 364/424.051 |
| 5,659,473 | 8/1997 | Noro et al. | 364/424.052 |
| 5,698,956 | 12/1997 | Nishino et al. | 318/432 |
| 5,742,919 | 4/1998 | Ashrafi et al. | 701/70 |
| 5,743,351 | 4/1998 | McLaughlin | 180/446 |
| 5,752,209 | 5/1998 | Nishimoto et al. | 701/41 |
| 5,774,819 | 6/1998 | Yamamoto et al. | 701/41 |
| 5,787,376 | 7/1998 | Nishino et al. | 701/41 |
| 5,799,259 | 8/1998 | Rief et al. | 701/41 |
| 5,839,537 | 11/1998 | Nishino et al. | 180/443 |
| 5,927,430 | 7/1999 | Mukai et al. | 180/446 |

FOREIGN PATENT DOCUMENTS 60-193868 12/1985 Japan .
1-9064 1/1989 Japan .

*Primary Examiner*—Eric Culbreth
*Assistant Examiner*—L. Lum
*Attorney, Agent, or Firm*—Merchant & Gould P.C.

[57] ABSTRACT

A control unit of an electric power steering apparatus has an overload preventing part having the function of decreasing the current supplied to a motor of the electric power steering apparatus when a state such that a steering torque acting on the steering system is above a predetermined value and the steering speed of the steering system is below a predetermined value has continued for a predetermined time or having the function of immediately decreasing the current supplied to the motor when the steering speed of the steering system is below a predetermined value and the steering torque acting on the steering system is above a first predetermined value and decreasing the current supplied to the motor when a state such that the steering speed is below a predetermined value and the steering torque is above a second predetermined value smaller than the first predetermined value has continued for a predetermined time. As a result, a stable steering assist torque can be supplied from the motor even when a steering operation is carried out slowly and an excessive current is not continuously supplied to the motor when the steering system has reached a maximum steering angle position.

6 Claims, 8 Drawing Sheets

ELECTRIC POWER STEERING APPARATUS

BACKGROUND OF THE INVENTION

1. Field of the Invention

This invention relates to an electric power steering apparatus for applying power from an electric motor to a steering system to lighten the steering force that must be exerted by a driver, and more particularly to an electric power steering apparatus with which when the steering system has been turned to a maximum steering angle position an excessive current is not continuously supplied to the motor.

2. Description of the Related Art

In an electric power steering apparatus for applying a steering assist force (steering assist torque) outputted by a motor to a steering force transmitting system, a current passing through the motor is controlled in correspondence with steering information such as steering wheel steering angle, steering speed and steering force (steering torque) and motion information of vehicle speed, and a steering assist force outputted by the motor is made to act on turning wheels of the vehicle by way of a steering mechanism and causes the turning wheels to turn.

For example, in a rack and pinion type electric power steering apparatus, a steering force from the steering wheel and a steering assist force from the motor are made to act on a rack and move the rack from a neutral position in a left-right axial direction, and this movement of the rack is transmitted by tie rods to turning wheels and causes the turning wheels to turn.

In this kind of electric power steering apparatus, by the rack being made to abut with a gear case or the like at left and right maximum movement positions of the rack (hereinafter called maximum steering angle positions), the rack is prevented from moving beyond the maximum steering angle positions and it is made impossible for the steering wheel to be turned to beyond the maximum steering angle positions. Therefore, when the rack is in a maximum steering angle position it is not necessary for a steering assist force to be supplied from the motor and it is desirable that the steering assist force outputted from the motor be limited to reduce its power consumption.

In Japanese Utility Model Laid-Open Publication No. SHO-60-193868, an electric power steering apparatus is disclosed wherein a microswitch for detecting that the rack has moved to a maximum steering angle position is mounted in a gear case and the steering assist force is reduced on the basis of the output of this microswitch.

However, with a construction having a microswitch for detecting that the rack has moved to a maximum steering angle position, because it is necessary for wiring to be provided between the microswitch mounted in the gear case and a control unit and considerable accuracy is needed in the mounting position of the microswitch, the assembly labor increases.

To overcome the foregoing, in Japanese Patent Laid-Open Publication No. HEI-1-9064, the present inventors have proposed an electric power steering apparatus having steering force detecting means for detecting a steering force of a steering system, steering speed detecting means for detecting a steering speed of the steering system, and overload preventing means for reducing the current flowing through a motor when the steering force detected by the steering force detecting means is above a predetermined value and the steering speed detected by the steering speed detecting means is below a predetermined value.

A block diagram of a control unit of a known electric power steering apparatus having overload preventing means of this kind is shown in FIG. 9 hereof.

Referring to FIG. 9, a control unit 120 has a target current calculating part 121, a steering speed calculating part 122, an overload preventing part 123 and a motor driving part 124. BAT is a battery power source, and the reference numeral 125 denotes a motor current detector for detecting the current flowing through a motor 110 and outputting a motor current signal (hereinafter called the motor current) IM. The reference numeral 126 denotes a motor voltage detector for detecting the voltage impressed on the motor 110 and outputting a motor voltage signal (hereinafter called the motor voltage) EM.

The target current calculating part 121 obtains a basic current that should be supplied to the motor 110 to cause the motor 110 to produce a steering assist torque corresponding to a steering torque on the basis of a steering torque signal Tp outputted from a steering torque detector 112 and corrects this basic current value in correspondence with a vehicle speed signal 114a outputted by a vehicle speed sensor 114. The target current calculating part 121 also corrects the basic current value in correspondence with a steering speed signal (hereinafter called the steering speed) VM outputted from the steering speed calculating part 122 and outputs the corrected current to be supplied to the motor as a target current value (hereinafter called the target current) IT. The target current IT is supplied through the overload preventing part 123 to the motor driving part 124.

The steering speed calculating part 122, which constitutes a steering speed detecting part, estimates a motor speed VM from the motor current IM and the motor voltage EM on the basis of Exp. (1) below and outputs the estimated motor speed VM as a steering speed VM.

$$VM = (EM - IM \cdot RM)/Kp \qquad (1)$$

where RM is the resistance of the motor and Kp is an induced voltage coefficient.

There is a fixed relationship between the motor speed (the rotational speed of the motor) and the steering speed, and therefore it is possible to treat the motor speed calculated using Exp. (1) as a steering speed VM. The steering speed VM is supplied to the target current calculating part 121 and the overload preventing part 123.

Alternatively, instead of a steering speed VM equivalent to the motor speed VM being estimated by calculation from the current IM and the motor voltage EM, a steering speed detector may be provided on the steering shaft in place of the steering speed calculating part 122 to detect the actual steering speed.

The overload preventing part 123 detects an overload state of the motor 110 and in the overload state reduces the current supplied to the motor 110 through the motor driving part 124 by decreasing the target current IT supplied to the motor driving part 124. For example, when the steering system has been turned to a maximum steering angle position or when a manual steering torque is being detected while the front wheels (turning wheels) are trapped in grooves or the like and cannot be steered, even if a current is supplied to the motor 110 so as to produce a steering assist torque corresponding with this manual steering torque, because the rack shaft cannot be moved any further the motor 110 cannot rotate and consequently power is consumed wastefully and the motor 110 is unnecessarily heated.

To avoid this, in the overload preventing part 123 shown in FIG. 9, when an overload state detecting part 131 detects an overload state it changes a multiplication coefficient K that it supplies to a multiplier 132 to 0.5 or below from a normal value of 1 and thereby causes a corrected target current ITH supplied to the motor driving part 124 to decrease. The overload state detecting part 131 is constructed to determine that the motor is in an overload state and change the multiplication coefficient K from its normal value of 1 to 0.5 or below when the motor current IM is larger than a preset value and the steering speed VM is smaller than a preset steering speed.

The motor driving part 124 has a deviation calculating art 141, a PID control part 142, a PWM signal generating part 143, a gate driving circuit part 144 and a motor driving circuit part 145 consisting of four power field effect transistors connected in an H-type bridge.

The deviation calculating part 141 obtains the deviation between the corrected target current ITH and the motor current IM detected by a motor current detector 125 and outputs a deviation signal 141a. The deviation signal 141a is supplied to the PID control part 142.

The PID control part 142 carries out processing such as proportional, integral and differential processing on the deviation signal 141a and generates and outputs a drive control signal 142a for controlling the current supplied to the motor 110 so that the above-mentioned deviation approaches zero. The drive control signal 142a is supplied to the PWM signal generating part 143.

The PWM signal generating part 143 generates and outputs PWM (Pulse Width Modulation) signals 143a for PWM-operating the motor 110 on the basis of the drive control signal 142a. The PWM signals 143a are supplied to the gate driving circuit part 144. The gate driving circuit part 144 drives the gates of the field effect transistors and thereby drives switching of the field effect transistors on the basis of the PWM signals 143a.

The control unit 120 PWM-controls the power supplied from the battery power source BAT to the motor 110 on the basis of the steering torque Tp detected by the steering torque detector 112 and thereby controls the output power (the steering assist torque) of the motor 110, and when it is detected by the overload state detecting part 131 inside the overload preventing part 123 that the motor 110 is in an overload state the control unit 120 reduces the current supplied to the motor 110 by decreasing the corrected target current ITH supplied to the motor driving part 124.

However, because the overload preventing part 123 of the control unit 120 shown in FIG. 9 is constructed to determine that the motor is in an overload state and reduce the current supplied to the motor when the motor current IM is larger than a preset value and the steering speed VM is smaller than a preset steering speed, when a steering operation is carried out slowly it sometimes happens that although the steering system has not been turned to a maximum steering angle position it is mistakenly detected that the motor 110 is overloaded and the current supplied to the motor 110 is consequently reduced. When the current supplied to the motor 110 is reduced as a result of an erroneous detection like this, because the steering assist torque supplied from the motor 110 is decreased, the steering may become heavy and disconcert the driver.

Therefore, there is a demand for the provision of an electric power steering apparatus with which even when a steering operation is carried out slowly a stable steering assist torque can be supplied from the motor and with which also an excessive current is not continuously supplied to the motor when the steering system has been turned to a maximum steering angle position.

SUMMARY OF THE INVENTION

According to a first aspect of the invention, there is provided an electric power steering apparatus which comprises a motor for applying a steering assist torque to a steering system connecting a steering wheel to turning vehicle wheels, and a control unit having an overload preventing part for decreasing the current supplied to the motor when a state such that the steering torque acting on the steering system exceeds a predetermined value and the steering speed of the steering system is below a predetermined value has continued for a preset time.

The electric power steering apparatus according to the invention may further comprise a motor current detector for detecting the motor current flowing through the motor and outputting a motor current signal, and the overload preventing part may be constructed to decrease the current supplied to the motor when a state such that the motor current signal is above a predetermined value and the steering speed of the steering system is below a predetermined value has continued for a predetermined time.

The electric power steering apparatus may further comprise addition to the above-mentioned motor current detector a motor voltage detector for detecting the motor voltage supplied to the motor and outputting a motor voltage signal and a steering speed calculating part for calculating the steering speed of the steering system on the basis of the motor current signal and the motor voltage signal, and the overload preventing part may be constructed to decrease the current supplied to the motor when a state such that the motor current signal is above a predetermined value and the steering speed calculated by the steering speed calculating part is below a predetermined value has continued for a predetermined time.

According to a second aspect of the present invention, there is provided an electric power steering apparatus which comprises a motor for applying a steering assist torque to a steering system connecting a steering wheel to turning vehicle wheels, and a control unit having an overload preventing part for immediately decreasing the current supplied to the motor when the steering speed of the steering system is below a predetermined value and the steering torque acting on the steering system exceeds a first predetermined value and decreasing the current supplied to the motor when a state such that the steering speed of the steering system Is below a predetermined value and the steering torque acting on the steering system exceeds a second predetermined value smaller than the first predetermined value has continued for a preset time.

The electric power steering apparatus according to the second aspect of the invention may have a motor current detector for detecting the current flowing through the motor and detect a steering force acting on the steering system on the basis of the motor current detected by this motor current detector.

Also, the electric power steering apparatus may have a motor current detector for detecting the motor current flowing through the motor and a motor voltage detector for detecting the motor voltage supplied to the motor and a steering speed calculating part for calculating a steering speed on the basis of the motor current detected by the motor current detector and the motor voltage detected by the motor voltage detector.

BRIEF DESCRIPTION OF THE DRAWINGS

Certain preferred embodiments of the present invention will be described in more detail below, by way of example only, with reference to the accompanying drawings, wherein.

DETAILED DESCRIPTION OF THE PREFERRED EMBODIMENTS

The following description is merely exemplary in nature and is in no way intended to limit the invention or its application or uses.

Figure 1:
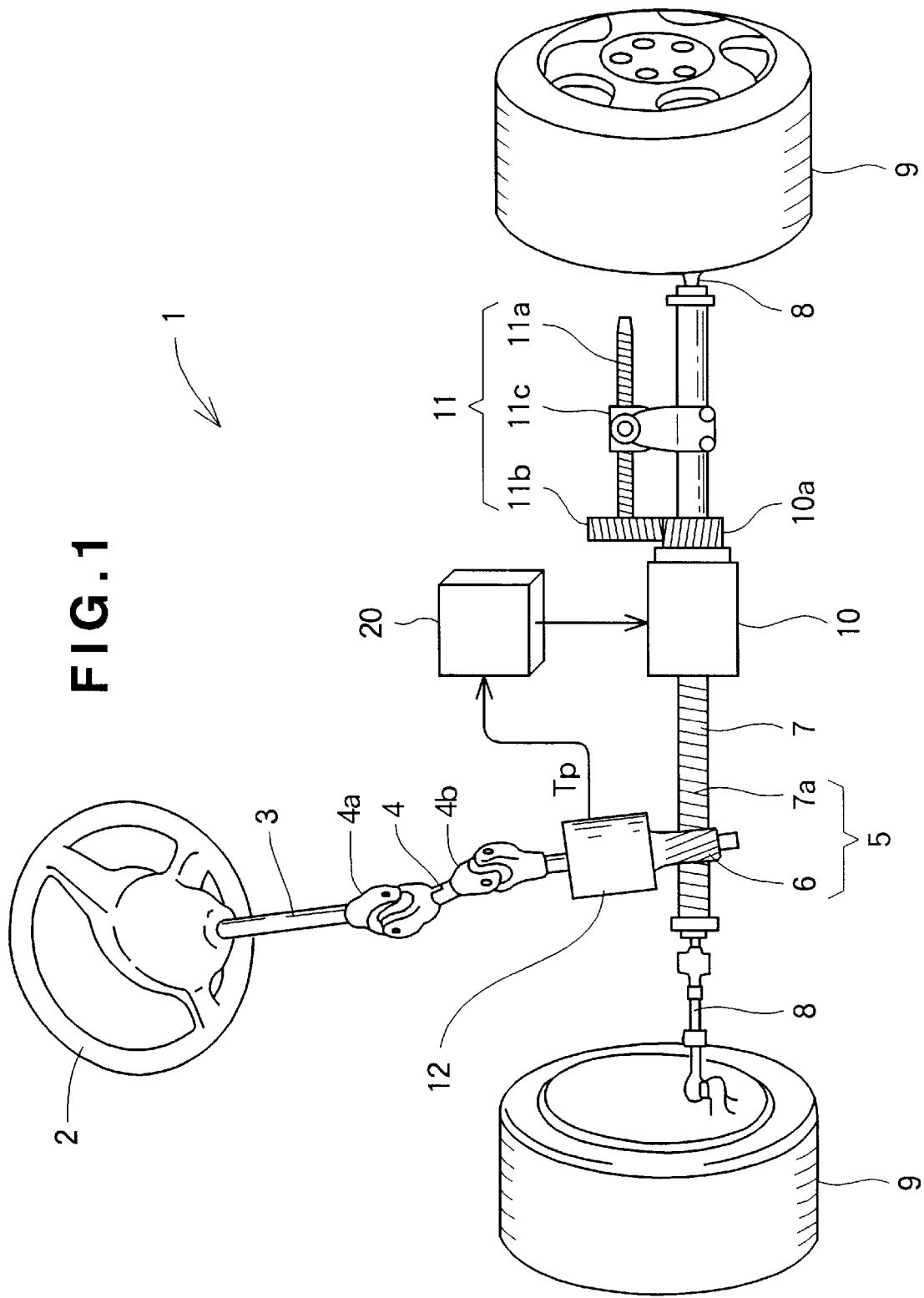
FIG. 1 is a schematic view of an electric power steering apparatus.

Referring to FIG. 1, an electric power steering apparatus 1 has a motor 10 in a steering system connecting a steering wheel 2 to turning vehicle wheels 9, 9, and lightens the steering force that must be exerted by a driver by controlling power supplied from the motor using a control unit 20.

A steering shaft 3 connected to the steering wheel 2 is connected to a pinion 6 of a rack and pinion mechanism 5 by way of a connecting shaft 4 having universal couplings 4a, 4b. A rack shaft 7 has rack teeth 7a meshing with the pinion 6. The rack and pinion mechanism 5 converts rotation of the pinion 6 into reciprocating motion of the rack shaft 7. Left and right turning wheels 9, 9 are connected to the ends of the rack shaft 7 by tie rods 8. When the steering wheel 2 is turned, the front wheels 9, 9 are turned by way of the rack and pinion mechanism 5 and the tie rods 8. In this way it is possible to steer the vehicle.

To lighten the steering force that must be exerted by a driver on the steering wheel 2, a motor 10 for supplying a steering assist torque to the steering system is disposed coaxially with the rack shaft 7 and a rotational output of the motor 10 is converted into a thrust force and made to act on the rack shaft 7 by a ball screw mechanism 11 mounted substantially parallel with the rack shaft 7. A helical drive gear 10a is mounted on the rotor of the motor 10. A helical gear 11b mounted on the end of a screw shaft 11a of the ball screw mechanism 11 meshes with the helical drive gear 10a. A nut 11c of the ball screw mechanism 11 is connected to the rack shaft 7.

A steering torque detector (steering torque sensor) 12 mounted in a steering box (not shown) detects a manual steering torque acting on the pinion 6 and supplies a steering torque Tp corresponding to the detected steering torque to the control unit 20. The control unit 20 controls the output power of the motor 10 (the steering assist torque) on the basis of the steering torque Tp.

Figure 2:
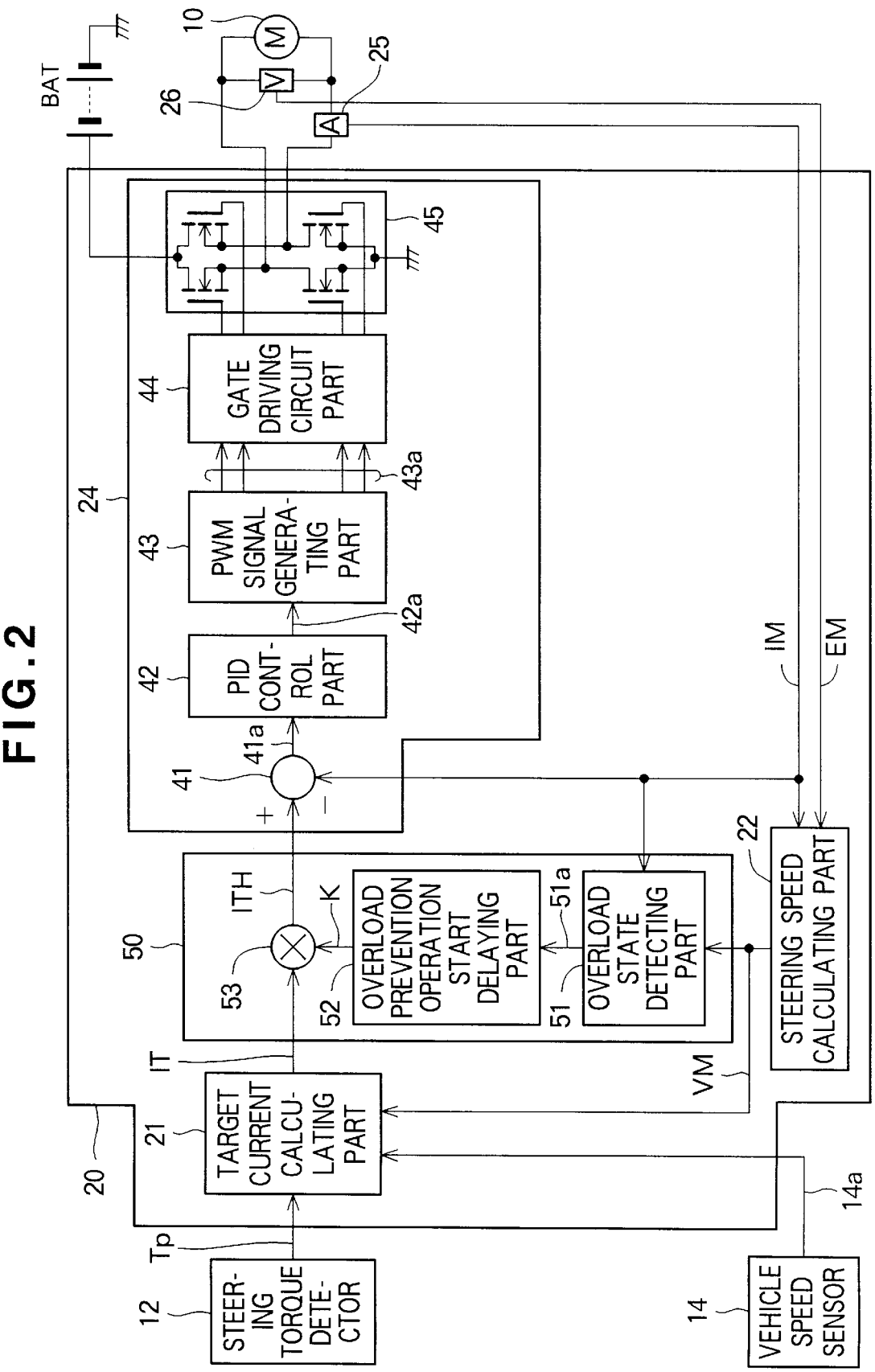
FIG. 2 is a block diagram of a control unit of a first preferred embodiment of the invention.

FIG. 2 is a block diagram of a control unit of a first preferred embodiment of an electric power steering apparatus according to the present invention.

Figure 9:
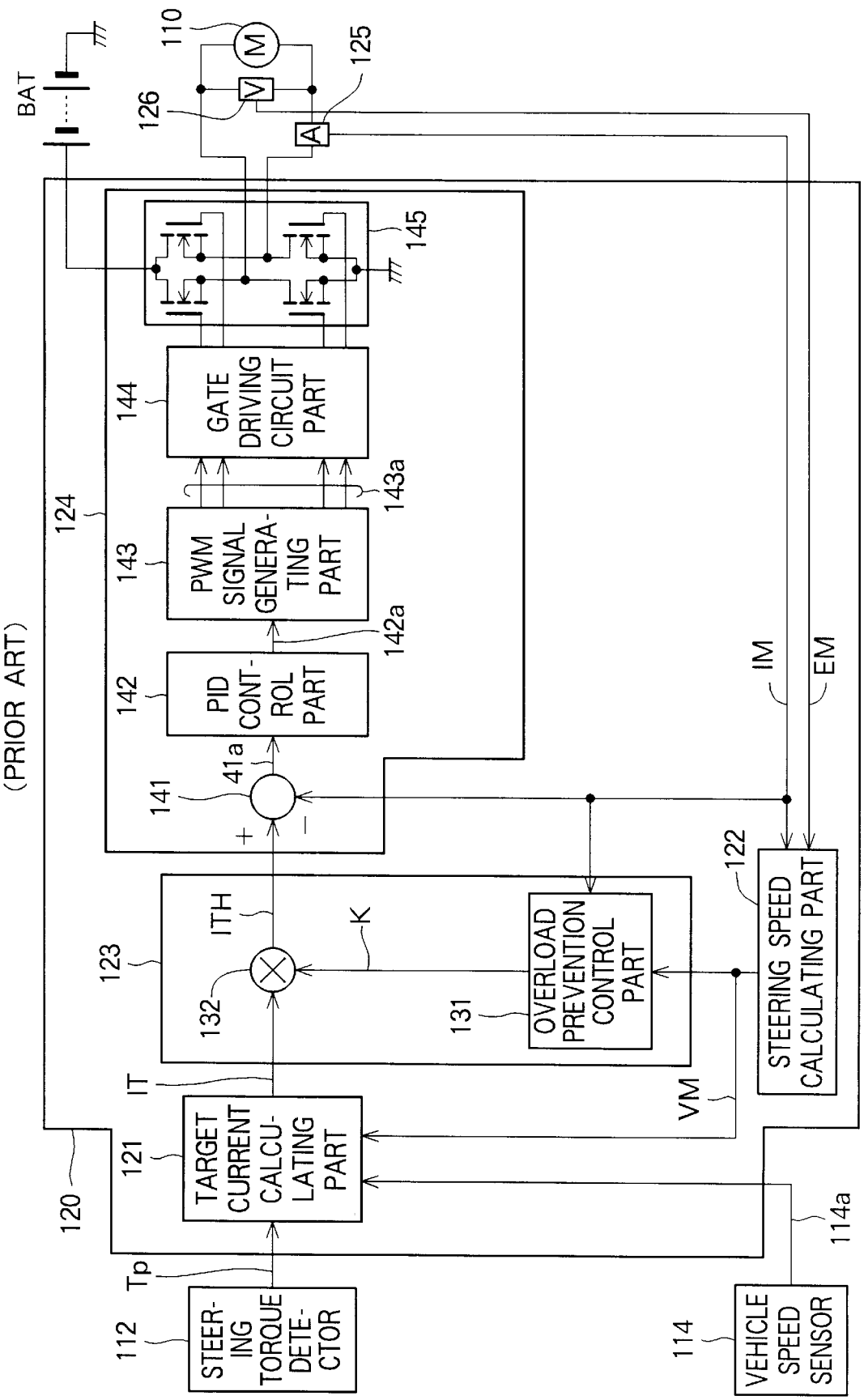
FIG. 9 is a block diagram of a known control unit.

Referring to FIG. 2, a control unit 20 has a target current calculating part 21, a steering speed calculating part 22, an overload preventing part 50 and a motor driving part 24. BAT denotes a battery power source, and the reference numeral 25 denotes a motor current detector for detecting the current flowing through the motor 10 and outputting a motor current signal (hereinafter called the motor current) IM. The reference numeral 26 denotes a motor voltage detector for detecting the voltage impressed on the motor 10 and outputting a motor voltage signal (hereinafter called the motor voltage) EM. In the control unit 20 shown in FIG. 2, the construction of the overload preventing part 50 is different from that of the known control unit 120 shown in FIG. 9.

The target current calculating part 21 obtains a basic current that should be supplied to the motor 10 to cause the motor 10 to produce a steering assist torque corresponding with the steering torque on the basis of the steering torque Tp outputted from the steering torque detector 12 and corrects this basic current value in correspondence with a vehicle speed signal 14a outputted by a vehicle speed sensor 14, and also corrects the basic current value in correspondence with a steering speed signal (hereinafter called the steering speed) VM outputted from the steering speed calculating part 22 and outputs the corrected current to be supplied to the motor as a target current value (hereinafter called the target current) IT. The target current IT is supplied through the overload preventing part 50 to the motor driving part 24.

The steering speed calculating part 22, which constitutes steering speed detecting part, estimates a motor speed VM from the motor current IM and the motor voltage EM by calculation on the basis of Exp. (1) and outputs the estimated motor speed VM as a steering speed VM.

$$VM = (EM - IM \cdot RM)/Kp \qquad (1)$$

Here, RM is the resistance of the motor and Kp is an induced voltage coefficient.

There is a fixed relationship between the motor speed (the rotational speed of the motor) and the steering speed, and therefore it is possible to treat the motor speed as a steering speed VM. The steering speed VM is supplied to the target current calculating part 21 and the overload preventing part 50.

Alternatively, instead of a steering speed VM equivalent to the motor speed VM being estimated by calculation from the motor current IM and the motor voltage EM, a steering speed detector may be provided on the steering shaft in place of the steering speed calculating part 22 to detect the steering speed directly.

The overload preventing part 50 has an overload state detecting part 51, an overload prevention operation start delaying part 52 and a multiplier 53. This overload preventing part 50 detects an overload state of the motor 10, and in the overload state decreases the current supplied to the motor 10 through the target current calculating part 21 by reducing the target current IT supplied to the motor driving part 24. For example, when a manual steering torque is being detected when the steering system has been turned to a maximum steering angle position or while the front wheels (turning wheels) are trapped in grooves or the like and cannot be turned, even if a current is supplied to the motor 10 so as to produce a steering assist torque corresponding with this manual steering torque, because the rack shaft cannot be moved any further the motor 10 cannot rotate and consequently power is consumed wastefully and the motor 10 is unnecessarily heated.

To avoid this, in the overload state detecting part 51 shown in FIG. 2, when the overload state detecting part 51 detects an overload state and outputs an overload state detection signal 51a, when the overload state detection signal 51a has continued for a preset time Tk (for example three to ten seconds) the overload prevention operation start delaying part 52 changes a multiplication coefficient K that it supplies to the multiplier 53 for example from a normal value of 1 to 0.5 and thereby decreases a corrected target current ITH supplied to the motor driving part 24.

The overload state detecting part 51 determines that the motor 10 is in an overload state and outputs the overload state detection signal 51a when the motor current IM is larger than a preset value and the steering speed VM is smaller than a preset steering speed.

The overload prevention operation start delaying part 52 monitors the time for which the outputting of the overload state detection signal 51a has continued and when the overload state detection signal 51a has continued for the preset time Tk (for example three to ten seconds) changes the multiplication coefficient K that it supplies to the multiplier 53 for example from a normal value of 1 to 0.5. When while the overload prevention operation start delaying part 52 is outputting a multiplication coefficient K whose value is 0.5 the overload state detection signal 51a ceases to be supplied to it, it returns the value of the multiplication coefficient K to 1.

The multiplier 53 multiplies the value of the target current IT supplied to it from the target current calculating part 21 by the multiplication coefficient K supplied to it from the overload prevention operation start delaying part 52 to obtain a corrected target current ITH (=K*IT). When an overload is not being detected (normal state), the value of the multiplication coefficient K is 1. Thus the overload preventing part 50 outputs the target current IT unchanged as the corrected target current ITH (=IT). When an overload has been being detected for more than the preset time Tk, the value of the multiplication coefficient K is 0.5. Thus when an overload is being detected, with respect to the target current IT, the overload preventing part 50 supplies to the motor driving part 24 a corrected target current ITH (=0.5*IT) having been decreased to 1/2 of the value of the target current IT.

The value of the multiplication coefficient K may be made to gradually decrease with time.

The motor driving part 24 has a deviation calculating part 41, a PID control part 42, a PWM signal generating part 43, a gate driving circuit part 44, and a motor driving circuit part 45 consisting of four power field effect transistors connected in an H-type bridge.

The deviation calculating part 41 obtains the deviation between the corrected target current ITH and the motor current IM detected by the motor current detector 25 and outputs a deviation signal 41a (=ITH−IM). The deviation signal 41a is supplied to the PID control part 42.

The PID control part 42 carries out processing such as proportional, integral and differential processing on the deviation signal 41a and generates and outputs a drive control signal 42a for controlling the current supplied to the motor 10 so that the above-mentioned deviation approaches zero. The drive control signal 42a is supplied to the PWM signal generating part 43.

The PWM signal generating part 43 generates and outputs PWM (Pulse Width Modulation) signals 43a for PWM-operating the motor 10 on the basis of the drive control signal 42a. The PWM signals 43a are supplied to the gate driving circuit part 44. The gate driving circuit part 44 drives the gates of the field effect transistors and thereby drives switching of the field effect transistors on the basis of the PWM signals 43a.

The control unit 20 shown in FIG. 2 PWM-controls the power supplied from the battery power source BAT to the motor 10 on the basis of the steering torque Tp detected by the steering torque detector 12 and thereby controls the output power of the motor 10 (the steering assist torque), and when it is detected by the overload state detecting part 51 inside the overload preventing part 50 that the running state of the motor 10 is an overload state and it is further confirmed by the overload prevention operation start delaying part 52 that the overload detection state has continued for a predetermined time (Tk), the control unit 20 reduces the current supplied to the motor 10 by decreasing the corrected target current ITH supplied to the motor driving part 24.

Therefore, even when a steering operation has been carried out slowly and the steering speed VM detected by the steering speed calculating part 22 has a low value and the overload state detection signal 51a is consequently outputted from the overload state detecting part 51, it does not happen that immediately the current supplied to the motor 10 is decreased and the steering assist torque falls.

When the overload state detection signal 51a has continued for a predetermined time (Tk), the overload preventing part 50 reduces the corrected target current ITH supplied to the motor driving part 24 and consequently the current supplied to the motor 10 is lowered. Therefore, even when a manual steering torque is being detected when the steering system has been turned to a maximum steering angle position or when the front wheels (turning wheels) are trapped in grooves or the like and cannot be turned, it is possible to prevent an excessive current being continuously supplied to the motor.

Figure 3:
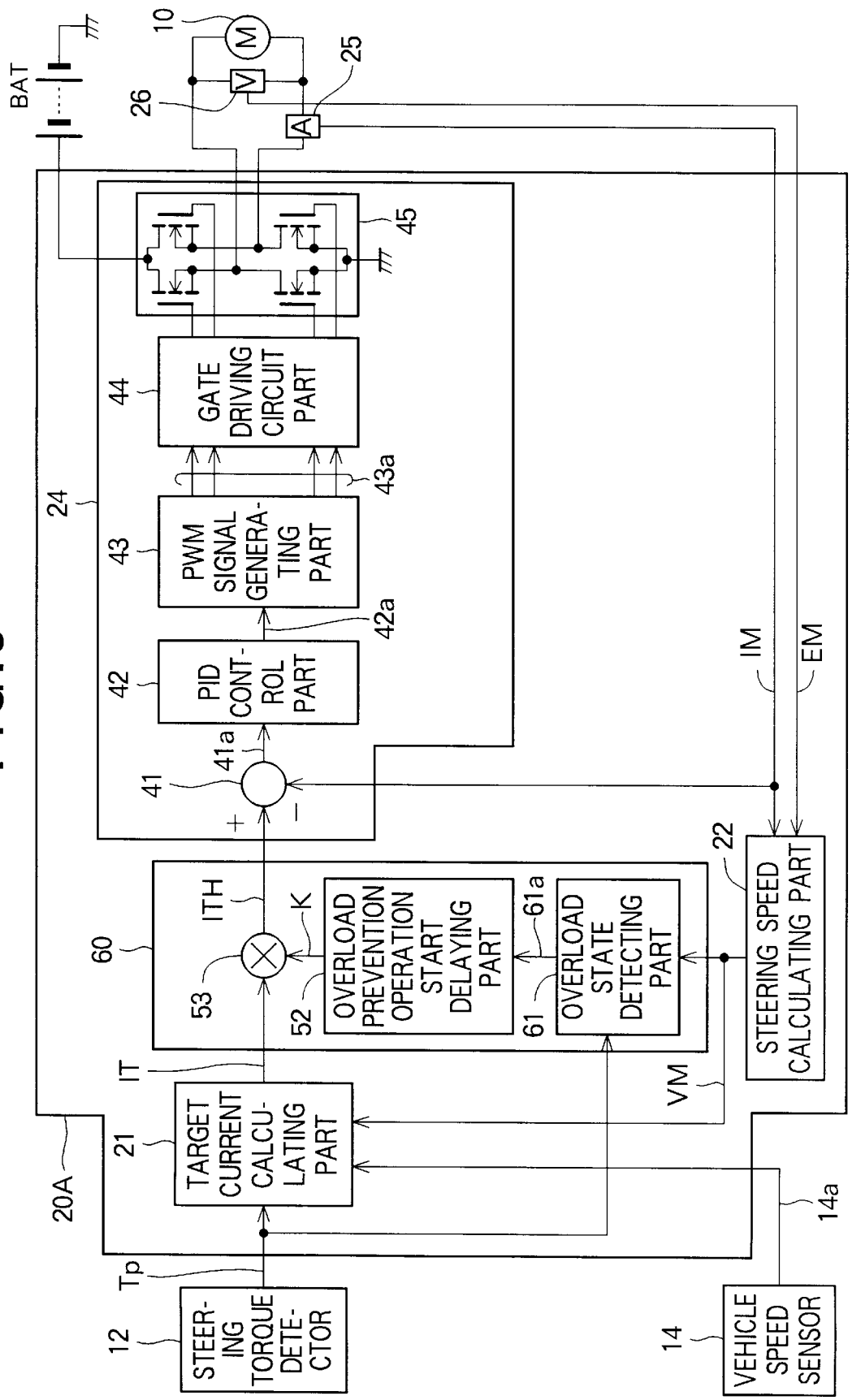
FIG. 3 is a block diagram of a control unit of another version of the first preferred embodiment.

FIG. 3 shows a block diagram of another version of the control unit of the first preferred embodiment.

In FIG. 3, in a control unit 20A, the construction of an overload state detecting part 61 inside an overload preventing part 60 differs from that of the overload state detecting part 51 of the preferred embodiment shown in FIG. 2. The overload state detecting part 51 shown in FIG. 2 is constructed to detect that the steering force acting on the steering system is above a predetermined value on the basis of the motor current IM. That is, in the control unit 20, because the motor current IM is controlled so as to cause a steering assist torque corresponding with the steering torque Tp to be produced from the motor 10, the motor current IM is a signal corresponding to the steering torque. Therefore, it is possible to detect that the steering force acting on the steering system is above a predetermined value by detecting that the motor current IM is above a predetermined value.

With respect to this, the overload state detecting part 61 shown in FIG. 3 detects that the steering force acting on the steering system is above a predetermined value on the basis of the steering torque signal Tp. This overload state detecting part 61 determines that the motor 10 is in an overload state and outputs an overload state detection signal 61a when the steering torque signal Tp is greater than a predetermined value and the steering speed VM is smaller than a preset steering speed.

The preferred embodiment shown in FIG. 2 and the modified version shown in FIG. 3 both have a motor driving part 24 which feedback controls the motor current IM on the basis of the deviation between the corrected target current ITH and the motor current IM; however, a construction wherein feedback control based on the motor current is not carried out may alternatively be adopted, and in this case it may not be necessary to provide a motor current detector 25. In a construction not having a motor current detector 25, an overload state can be detected by using an overload state detecting part 61 which determines that the motor 10 is in an overload state and outputs an overload state detection signal 61a when the steering torque signal Tp is greater than a predetermined value and the steering speed VM is smaller than a preset steering speed, as shown in FIG. 3.

The overload state detecting parts 51, 61 shown in FIG. 2 and FIG. 3 may alternatively be constructed to detect that the steering force acting on the steering system is above a predetermined value on the basis of the target current IT.

Also, instead of a steering speed VM being calculated from the motor current IM and the motor voltage EM, a steering speed detector can be provided on the steering shaft to detect the steering speed directly.

As described above, because the electric power steering apparatuses of the first preferred embodiment and the modified version thereof have an overload preventing part for reducing the current supplied to the motor when a state such that the steering force acting on the steering system is above a predetermined value and the steering speed of the steering system is below a predetermined value has continued for a predetermined time, even when the motor is temporarily determined to be in an overloaded state due to a steering operation being carried out slowly, the current supplied to the motor is not immediately reduced. And because the overload preventing art does reduce the current supplied to the motor when an overload state has continued for a predetermined time, it is possible to prevent an excessive current being continuously supplied to the motor at times such as when the steering system has been turned to a maximum steering angle position.

By a steering speed calculating part for estimating the steering speed of the steering system by calculation on the basis of a motor current signal and a motor voltage signal being provided, it is possible to obtain the steering speed without providing a steering speed detector. Thus it is possible to make the construction of the electric power steering apparatus simple.

Also, by the overload preventing part being constructed to reduce the current supplied to the motor when a motor current signal is above a predetermined value and a steering speed calculated by a steering speed calculating part is below a predetermined value it is possible to detect that the steering system is in a maximum steering angle position without providing a mechanical detecting part such as a microswitch for mechanically detecting that the steering system has been turned to a maximum steering angle position. Thus in this way also it is possible to make the construction of the electric power steering apparatus simple.

Figure 4:
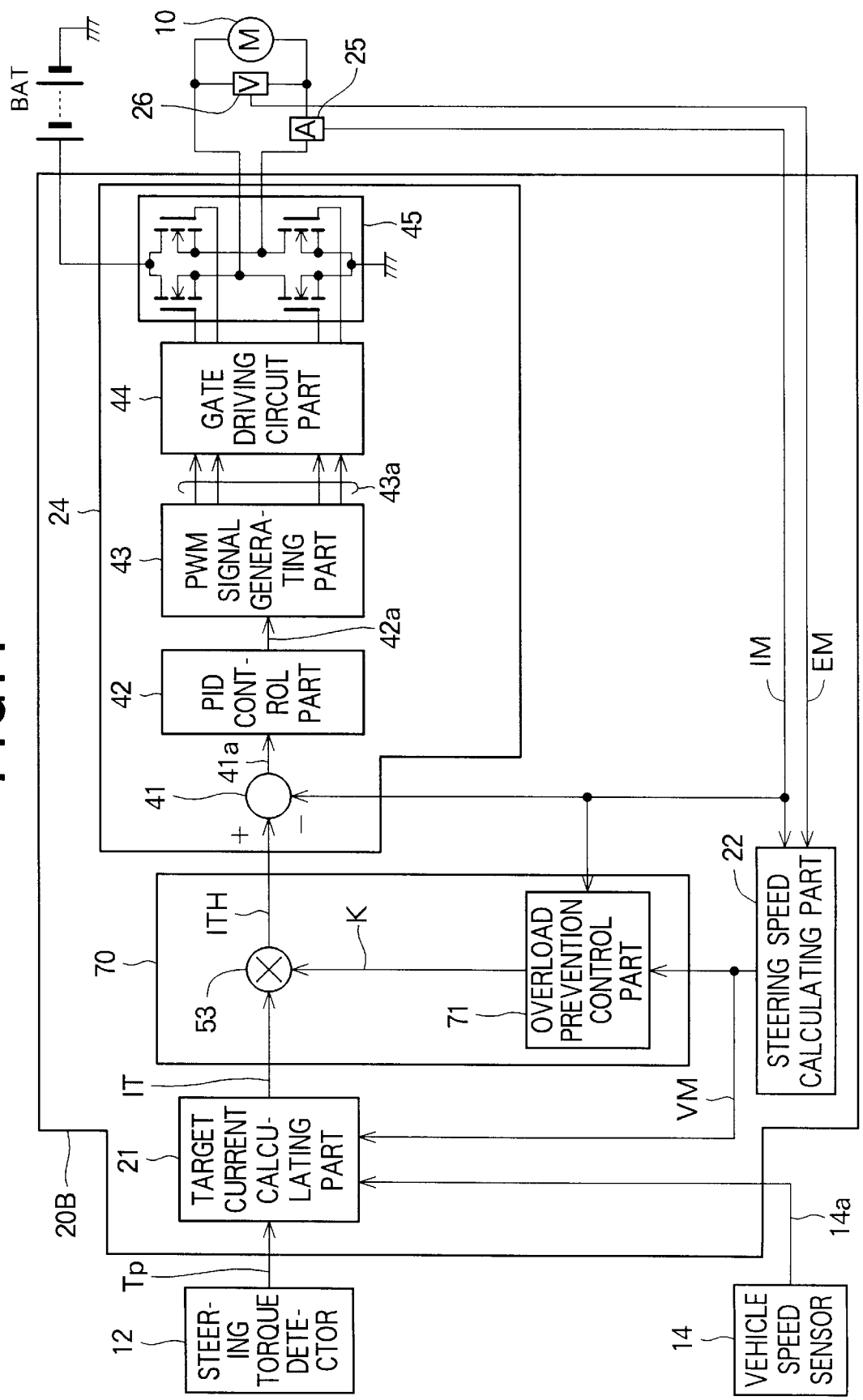
FIG. 4 is a block diagram of a control unit of a second preferred embodiment of the invention.

FIG. 4 is a block diagram of a control unit of a second preferred embodiment of an electric power steering apparatus according to the invention.

In the control unit 20B shown in FIG. 4, the construction of an overload preventing part 70 differs from that of the overload preventing part 50 shown in FIG. 2. The overload preventing part 70 of this preferred embodiment has an overload prevention control part 71 and a multiplier 53. This overload preventing part 70 detects an overload state of the motor 10 and in the overload state reduces the current supplied to the motor 10 through the motor driving part 24 by decreasing a target current ITH supplied to the motor driving part 24. For example, when a manual steering torque is being detected when the steering system has been turned to a maximum steering angle position or while the front wheels (turning wheels) are trapped in grooves or the like and cannot be turned, even if a current is supplied to the motor 10 so as to produce a steering assist torque corresponding with this manual steering torque, because the rack shaft cannot be moved any further the motor 10 also cannot rotate and consequently power is consumed wastefully and the motor 10 is unnecessarily heated.

To avoid this, in the overload preventing part 70 shown in FIG. 4, when an overload state is detected by the overload prevention control part 71, by a multiplication coefficient K supplied to a multiplier 53 being changed from a normal value of 1 to for example 0.5, the corrected target current ITH supplied to the motor driving part 24 is decreased. The reason for the multiplication coefficient K being set to for example about 0.5 in the overload state is to supply a steering assist force to resist tire reactions.

Figure 5:
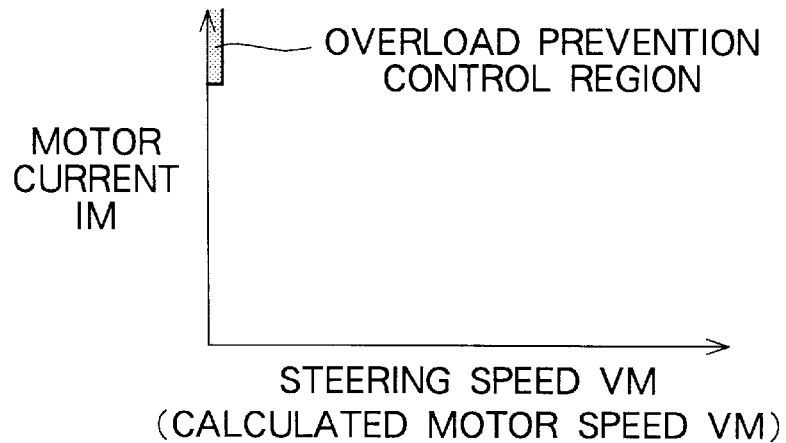
FIG. 5 is a graph illustrating a region in which overload prevention control is carried out in the second preferred embodiment.

FIG. 5 is a graph illustrating a region in which overload prevention control is carried out.

On the basis of the steering speed VM obtained from the above-mentioned Exp. (1) by the steering speed calculating part 22 and the motor current IM, the overload preventing part 70 identifies a state wherein the steering has reached an end (a maximum steering angle position) or a turning wheel is trapped in a groove or abutting with a curb and cannot be turned and power is consequently being wastefully consumed by the motor 10, and determines the necessity of overload prevention. Specifically, it determines that overload prevention control is necessary when the motor current IM is above a predetermined value and the motor speed VM estimated by the steering speed calculating part 22 is below a predetermined value (is substantially zero).

Here, the accuracy of detection of the steering speed (motor speed) VM obtained (estimated) by calculation on the basis of the motor current IM and the motor voltage EM is lower the lower the steering speed is. Also, because the resistance RM and the induced voltage coefficient Kp of the motor have temperature characteristics, an error arises in the steering speed (motor speed) VM obtained (estimated) by calculation on the basis of the motor current IM and the motor voltage EM along with changes in the ambient temperature.

To overcome this, when the steering speed VM estimated by the steering speed calculating part 22 is below a predetermined value (a value close to zero) and the motor current IM is above a first predetermined value, for example the maximum value outputted by the target current calculating part 21 (hereinafter called the maximum target current) or a maximum target value, the overload prevention control part 71 determines that the motor 10 is in an overload state and immediately changes the multiplication coefficient K it supplies to the multiplier 53 from a normal value of 1 to for example 0.5 and thereby immediately reduces the corrected target current ITH supplied to the motor driving part 24.

Also, when a state such that the steering speed VM estimated by the steering speed calculating part 22 is below a predetermined value (a value close to zero) and the motor current IM is above a second predetermined value lower than the first predetermined value, for example a value lower than the maximum target current (for example 75% of the maximum target current), has continued for a predetermined time (for example three seconds), the overload prevention control part 71 determines that the motor 10 is in an overload state and changes the multiplication coefficient K it supplies to the multiplier 53 from a normal value of 1 to for example 0.5 and thereby reduces the corrected target current ITH supplied to the motor driving part 24.

When the overload prevention control part 71 has changed the multiplication coefficient K it supplies to the multiplier 53 to its normal value of 1 to for example 0.5 and is thereby reducing the corrected target current ITH supplied to the motor driving part 24, when the steering speed VM ceases to be substantially zero and the motor ceases to be in an overload state, the overload prevention control part 71 immediately returns the multiplication coefficient K to its normal value of 1.

The multiplier 53 multiplies the target current IT supplied to it from the target current calculating part 21 by the multiplication coefficient K supplied to it from the overload prevention control part 71 to obtain a corrected target current ITH. When an overload state is not being detected (in the normal state) the value of the multiplication coefficient K is 1. Therefore, the overload preventing part 70 outputs the target current IT unchanged as the corrected target current ITH. Thus when an overload is being detected, with respect to the target current IT, the overload preventing part 70 supplies to the motor driving part 24 a corrected target current ITH having been decreased to for example ½ of the value of the target current IT.

Returning to FIG. 4, the motor driving part 24 has a deviation calculating part 41, a PID control part 42, a PWM signal generating part 43, a gate driving circuit part 44, and a motor driving circuit part 45 consisting of four power field effect transistors connected in an H-type bridge.

The deviation calculating part 41 obtains the deviation between the corrected target current ITH and the motor current IM detected by the motor current detector 25 and outputs a deviation signal 41a. The deviation signal 41a is supplied to the PID control part 42.

The PID control part 42 carries out processing such as proportional, integral and differential processing on the deviation signal 41a and generates and outputs a drive control signal 42a for controlling the current supplied to the motor 10 so that the above-mentioned deviation approaches zero. The drive control signal 42a is supplied to the PWM signal generating part 43.

The PWM signal generating part 43 generates and outputs PWM (Pulse Width Modulation) signals 43a for PWM-operating the motor 10 on the basis of the drive control signal 42a. The PWM signals 43a are supplied to the gate driving circuit part 44. The gate driving circuit part 44 drives the gates of the field effect transistors and thereby drives switching of the field effect transistors on the basis of the PWM signals 43a.

The control unit 20B shown in FIG. 4 PWM-controls the power supplied from the battery power source BAT to the motor 10 on the basis of the steering torque Tp detected by the steering torque detector 12 and thereby controls the output power of the motor 10 (the steering assist torque), and when it is detected by the overload state detecting part 71 inside the overload preventing part 70 that the running state of the motor 10 is an overload state the control unit 20B reduces the current supplied to the motor 10 by decreasing the corrected target current ITH supplied to the motor driving part 24.

Figure 6:
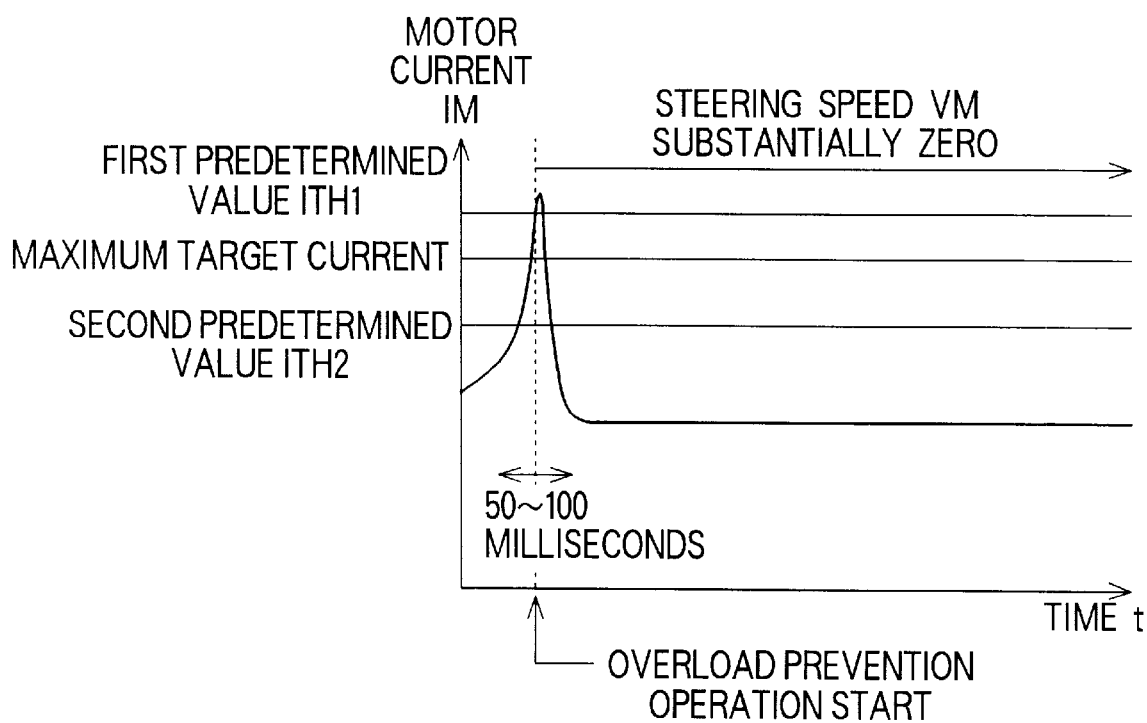
FIG. 6 is a graph illustrating a specific example of detection of an overload state and a motor current reducing operation in the second preferred embodiment.

FIG. 6 is a graph illustrating a specific example of detection of a motor overload state and a motor current reducing operation.

In FIG. 6, the horizontal axis shows time t and the vertical axis shows motor current IM. When the motor current IM rises above a first predetermined value ITH1 while the steering speed (estimated motor speed) VM estimated by the steering speed calculating part 22 shown in FIG. 4 on the basis of the motor current IM and the motor voltage EM is below a predetermined value (is substantially zero), at the point in time when the motor current IM passes the first predetermined value ITH1 the overload prevention control part 71 immediately changes the multiplication coefficient K for example from 1 to 0.5. As a result, the corrected target current ITH supplied from the overload preventing part 70 to the motor driving part 24 is reduced to for example ½ and the motor current IM supplied to the motor 10 is reduced. The overload preventing part 70 returns the multiplication coefficient K to 1 when the steering speed (estimated motor speed) VM rises above a predetermined value (substantially zero). Thus the condition of an overload state having being determined and the motor current IM being reduced is continued until the steering speed (estimated motor speed) VM rises above a predetermined value (substantially zero).

In the VM=(EM−IM·RM)/Kp of the foregoing Exp. (1), when VM suddenly becomes zero, because the motor voltage EM cannot change, the motor current IM suddenly increases and rises above the first predetermined value ITH1. For example, when the steering wheel is turned energetically and the steering system hits an end (maximum steering angle position) or the turning vehicle wheels hit a curb, because the steering speed VM suddenly becomes zero, the motor current IM may rise above the first predetermined value ITH1. Therefore, from the motor current IM rising above the first predetermined value ITH1 the overload preventing part 70 can detect that the steering system is at an end (maximum steering angle position) or that a turning wheel has hit a curb and cannot be turned and lower the current supplied to the motor 10.

Figure 7:
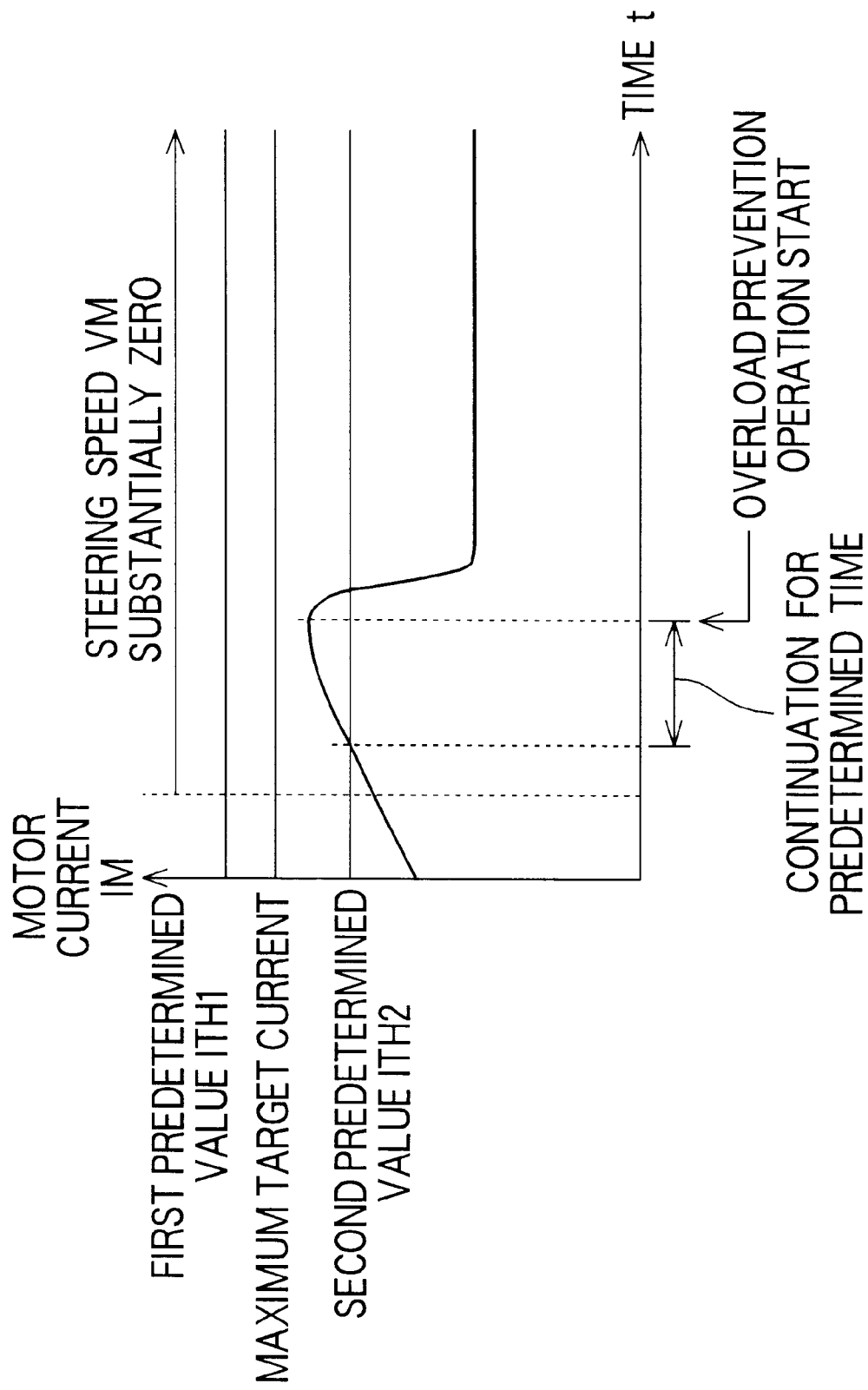
FIG. 7 is a graph showing another specific example of detection of an overload state and a motor current reducing operation in the second preferred embodiment.

FIG. 7 is a graph illustrating another specific example of detection of a motor overload state and a motor current reducing operation.

In FIG. 7, the horizontal axis shows time t and the vertical axis shows motor current IM. When a state wherein the motor current IM exceeds a second predetermined value ITH2 continues for a predetermined time (for example three seconds) while the steering speed (estimated motor speed) VM estimated by the steering speed calculating part 22 shown in FIG. 4 on the basis of the motor current IM and the motor voltage EM is below a predetermined value (is substantially zero), when the state of the motor current IM exceeding the second predetermined value ITH2 has continued for the predetermined time (for example three seconds) the overload prevention control part 71 changes the multiplication coefficient K for example from 1 to 0.5. As a result, the corrected target current ITH supplied from the overload preventing part 70 to the motor driving part 24 is reduced to for example ½ and the motor current IM supplied to the motor 10 is reduced. The overload preventing part 70 returns the multiplication coefficient K to 1 when the steering speed (estimated motor speed) VM rises above a predetermined value (substantially zero). Thus the condition of an overload state having being determined and the motor current IM being reduced is continued until the steering speed (estimated motor speed) VM rises above a predetermined value (substantially zero).

Thus when a steering operation is carried out slowly and the steering speed VM detected by the steering speed calculating part 22 has become a small value (substantially zero), if a state wherein the motor current IM exceeds the second predetermined value ITH2 smaller than the first predetermined value ITH1 continues for a predetermined time (for example three seconds) the overload preventing part 70 infers that the motor 10 is in an overload state and reduces the current supplied to the motor 10 by changing the multiplication coefficient K for example from 1 to 0.5. Because the overload preventing part 70 reduces the current supplied to the motor 10 when the state of the motor current IM exceeding the second predetermined value ITH2 has continued for a predetermined time, it does not happen that the current supplied to the motor 10 is reduced and the steering assist torque consequently falls immediately just because the motor current IM has risen above the second predetermined value ITH2 temporarily.

Because the overload preventing part 70 immediately reduces the current supplied to the motor when the steering speed VM is below a predetermined value (substantially zero) and the motor current IM exceeds a first predetermined value ITH1 and reduces the current supplied to the motor when the steering speed VM is below a predetermined value (substantially zero) and the motor current IM exceeds a second predetermined value ITH2 and this state has continued for a predetermined time (for example three seconds) in this way, even if a manual steering torque is detected when the steering system has been turned to a maximum steering angle position or when the front wheels (turning wheels) are trapped in grooves and cannot turn, it is possible to prevent an excessive current being continuously supplied to the motor.

Figure 8:
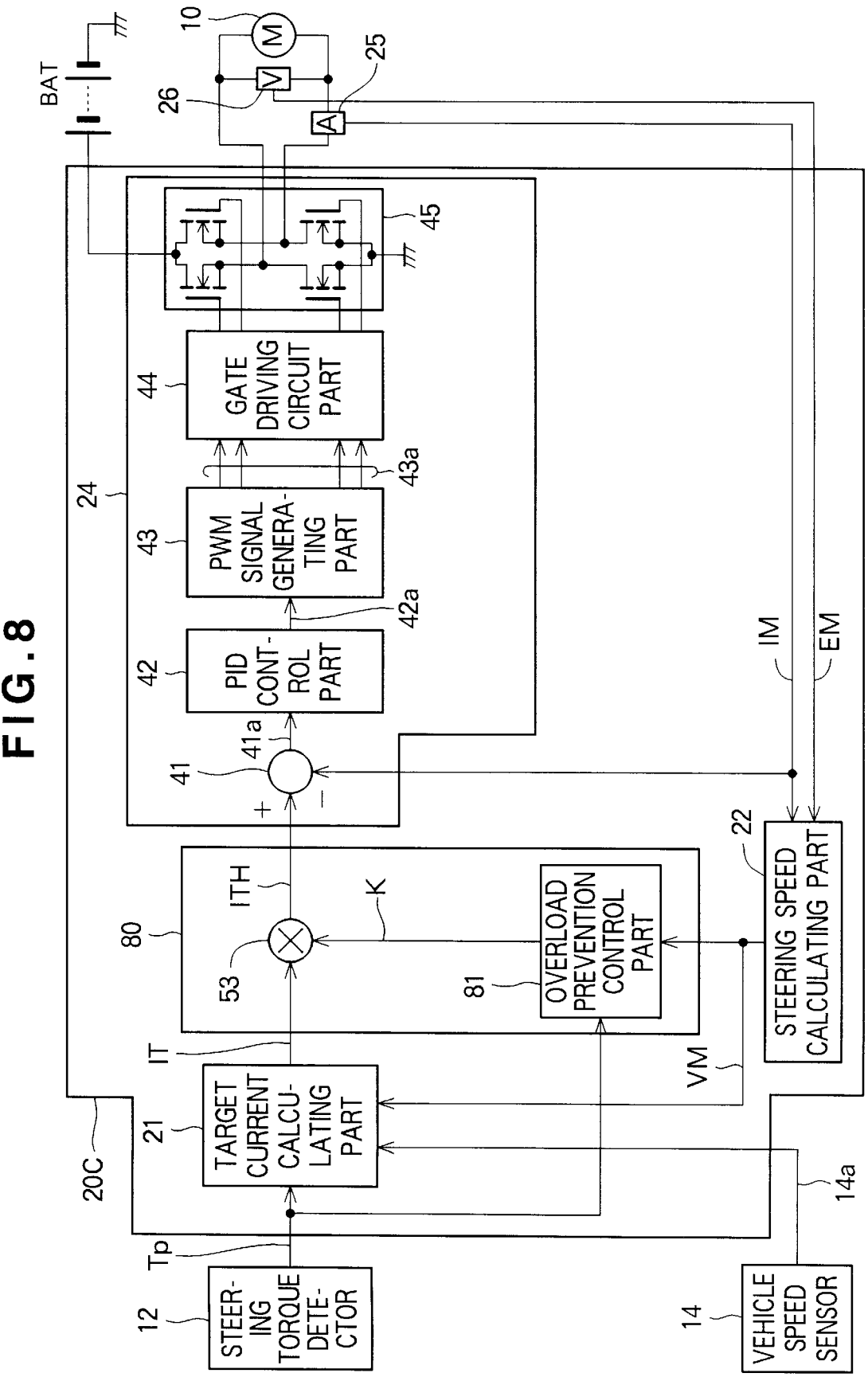
FIG. 8 is a block diagram of another version of the second preferred embodiment.

FIG. 8 is a block diagram of a modified version of the control unit of the second preferred embodiment.

In FIG. 8, the construction of an overload prevention control part 81 inside an overload preventing part 80 is different from that of the overload prevention control part 71 shown in FIG. 4. The overload prevention control part 71 shown in FIG. 4 is constructed to detect that the steering force acting on the steering system is greater than a predetermined value on the basis of the motor current IM. That is, in the control unit 20B, because the motor current IM is controlled so as to cause a steering assist torque corresponding with the steering torque Tp to be produced from the motor 10, the motor current IM is a signal corresponding to the steering torque. Therefore, it is possible to detect that the steering force acting on the steering system is above a predetermined value by detecting that the motor current IM is above a predetermined value.

With respect to this, the overload state detecting part 81 shown in FIG. 8 detects that the steering force acting on the steering system is above a predetermined value on the basis of the steering torque signal Tp outputted from the steering torque detector 12. This overload state detecting part 81 determines that the motor 10 is in an overload state and immediately reduces the current supplied to the motor 10 when the steering torque signal Tp is greater than a preset first predetermined value (for example a value not arising in normal steering but arising when the steering hits an end) and the steering speed VM calculated in the steering speed calculating part 22 is smaller than a preset steering speed. The overload prevention control part 81 also determines that the motor 10 is in an overload state and reduces the current supplied to the motor 10 when a state wherein the steering torque signal Tp exceeds a second predetermined value smaller than the first predetermined value (for example about 75% of the first predetermined value) and the steering speed VM is smaller than a preset steering speed has continued for a predetermined time (for example three seconds).

The control units 20B, 20C of the second preferred embodiment shown in FIG. 4 and the modified version thereof shown in FIG. 8 both have a motor driving part 24 which feedback controls the motor current IM on the basis of the deviation between the corrected target current ITH and the motor current IM; however, a construction wherein feedback control based on the motor current IM is not carried out may alternatively be adopted, and in this case it is not always necessary to provide a motor current detector 25. In a construction not having a motor current detector 25, an overload state can be detected by using an overload prevention control part 81 which determines that the motor 10 is in an overload state and reduces the current supplied to the motor 10 when the steering torque signal Tp is greater than a preset value and the steering speed VM is smaller than a preset steering speed, as shown in FIG. 8.

The overload state detecting parts 71, 81 may alternatively be constructed to detect that the steering force acting on the steering system is above a predetermined value on the basis of the target current IT.

Also, instead of a steering speed VM being calculated from the motor current IM and the motor voltage EM, a steering speed detector can be provided for example on the steering shaft to detect the steering speed directly.

Also, the multiplication coefficient K may be decreased gradually with time from 1 to 0.5.

As described above, the control units of the electric power steering apparatuses of the second preferred embodiment and the modified version thereof both have an overload preventing part and so perform control that when the steering speed of the steering system is below a predetermined value and the steering force acting on the steering system exceeds a first predetermined value it is determined that the steering system has reached a maximum steering angle position and the motor current is immediately decreased and the motor current is also decreased when a state wherein the steering speed is below a predetermined value and the steering force acting on the steering system exceeds a second predetermined value smaller than the first predetermined value has continued for a predetermined time. Therefore, the current supplied to the motor being immediately reduced and the steering consequently becoming heavy before the steering system reaches a maximum steering angle position can be prevented even when a steering operation is carried out slowly and also an excessive current being continuously supplied to the motor when the steering system has been turned to a maximum steering angle position can be prevented.

In the control units described above, by a steering speed calculating part for estimating the steering speed of the steering system by calculation on the basis of a motor current signal and a motor voltage signal being provided, it is possible to obtain the steering speed without providing a steering speed detector. Thus it is possible to make the construction of the electric power steering apparatus simple.

Also, by the overload preventing part being constructed to reduce the current supplied to the motor when the steering speed is below a predetermined value and the steering force is above a first predetermined value and when a state wherein the steering speed is below a predetermined value and the steering force exceeds a second predetermined value smaller than the first predetermined value has continued for a predetermined time, it is possible to detect that the steering system is in a maximum steering angle position without providing a mechanical detecting part such as a microswitch for mechanically detecting that the steering system has been turned to a maximum steering angle position, and to detect that the turning wheels are trapped in grooves and cannot be turned. Thus in this way also it is possible to make the construction of the electric power steering apparatus simple.

Obviously, various minor changes and modifications of the present invention are possible in the light of the above teaching. It is therefore to be understood that within the scope of the appended claims, the present invention may be practiced otherwise than as specifically described.

What is claimed is:

1. An electric power steering apparatus comprising:
   a motor for applying a steering assist torque to a steering system connecting a steering wheel to turning vehicle wheels; and
   a control unit having an overload preventing part for decreasing a current supplied to the motor when a state such that the steering torque acting on the steering system exceeds a predetermined value and a steering speed of the steering system is below a predetermined value has continued for a preset time.

2. An electric power steering apparatus according to claim 1, further comprising a motor current detector for detecting a current flowing through the motor and outputting a motor current signal, wherein the overload preventing part decreases the current supplied to the motor when a state such that the motor current signal exceeds a predetermined value and the steering speed of the steering system is below a predetermined value has continued for a preset time.

3. An electric power steering apparatus according to claim 2, further comprising a motor voltage detector for detecting a voltage supplied to the motor and outputting a motor voltage signal and a steering speed calculating part for calculating a steering speed of the steering system on a basis of the motor current signal and the motor voltage signal, wherein the overload preventing part decreases the current supplied to the motor when a state such that the motor current signal exceeds a predetermined value and the steering speed calculated by the steering speed calculating part is below a predetermined value has continued for a preset time.

4. An electric power steering apparatus comprising:
   a motor for applying a steering assist torque to a steering system connecting a steering wheel to turning vehicle wheels; and
   a control unit having an overload preventing part for immediately decreasing a current supplied to the motor when a steering speed of the steering system is below a predetermined value and the steering torque acting on the steering system exceeds a first predetermined value and decreasing the current supplied to the motor when a state such that the steering speed of the steering system is below a predetermined value and the steering torque acting on the steering system exceeds a second predetermined value smaller than the first predetermined value has continued for a preset time.

5. An electric power steering apparatus according to claim 4, further comprising a steering speed calculating part for calculating a steering speed of the steering system and a motor current detector for detecting the motor current flowing through the motor, wherein the overload preventing part immediately decreases the current supplied to the motor when the steering speed is below a predetermined value and the motor current exceeds a first predetermined value and decreases the current supplied to the motor when a state such that the steering speed is below a predetermined value and the motor current exceeds a second predetermined value smaller than the first predetermined value has continued for a preset time.

6. An electric power steering apparatus according to claim 5, further comprising a motor voltage detector for detecting a motor voltage supplied to the motor, wherein the steering speed calculating part calculates a steering speed of the steering system on a basis of the motor voltage and the motor current.

* * * * *